June 17, 1941. F. HEINMETS 2,246,043
MACHINE FOR MAKING TUBES
Filed Oct. 3, 1940 2 Sheets-Sheet 1

FERDINAND HEINMETS
INVENTOR.

BY John P. Nikonow

ATTORNEY

June 17, 1941.  F. HEINMETS  2,246,043
MACHINE FOR MAKING TUBES
Filed Oct. 3, 1940   2 Sheets-Sheet 2

*Ferdinand Heinmets*
INVENTOR.

BY  John P. Nilsonor
ATTORNEY

Patented June 17, 1941

2,246,043

UNITED STATES PATENT OFFICE 2,246,043

MACHINE FOR MAKING TUBES

Ferdinand Heinmets, Princeton, N. J.

Application October 3, 1940, Serial No. 359,492

9 Claims. (Cl. 93—82)

My invention relates to tube making machines and has particular reference to machines for making continuous tubes.

My invention has for its object to provide means to form a continuous tube on a mandrel out of a sheet material. For this purpose I provide means to bend the material into a tube around a mandrel with a small clearance, i. e., in such a manner as not to bind the tube tightly on the mandrel. The latter is made to reciprocate, a mechanism being provided for moving the tube forward with the mandrel, thereby forcing the material through a tube-forming fixture, the tube being released from the mandrel and permitted or forced to remain stationary when the mandrel moves rearward. My machine in this form is especially suitable for making tubes of thin sheet material including paper, such tubes, for instance, being used for enclosing dry batteries, for making paper containers, etc.

My machine also can be constructed for making tubes of a relatively heavy sheet material, a reciprocating clamp being provided periodically engaging the tube and pulling it forward through the tube-forming device, the clamp releasing the tube during its rearward movement. The mandrel may be dispensed with if the material is sufficiently strong or heavy.

The sheet material may be formed into a tube in any suitable manner, as, for instance, by passing it through a forming tube with gradually expanded and flattened guide at the entrance. The flat strip is thereby gradually forced to take a tubular shape.

Another object of my invention is to provide means to cut off portions of the tube with each forward stroke or movement of the mandrel. This is accomplished by using a rotary cutter at the free end of the mandrel, a mechanism being provided for pressing the cutter against the tube and for rotating the cutter around the tube. In order to simplify the cutting operation, the mandrel is caused to remain stationary at the end of its forward movement for a sufficient time to enable the cutter to complete the cutting operation.

Another object of my invention is to provide means to seal the seam of the tube. I provide for this purpose a reciprocating plunger which is pressed against the overlapping or otherwise abutting edges of the tube for their gluing together, soldering or welding. Other modifications of my invention are disclosed in my copending application Serial No. 392,240, filed May 7, 1941.

My invention is more fully described in the accompanying specification and drawings, in which.

Figure 1:
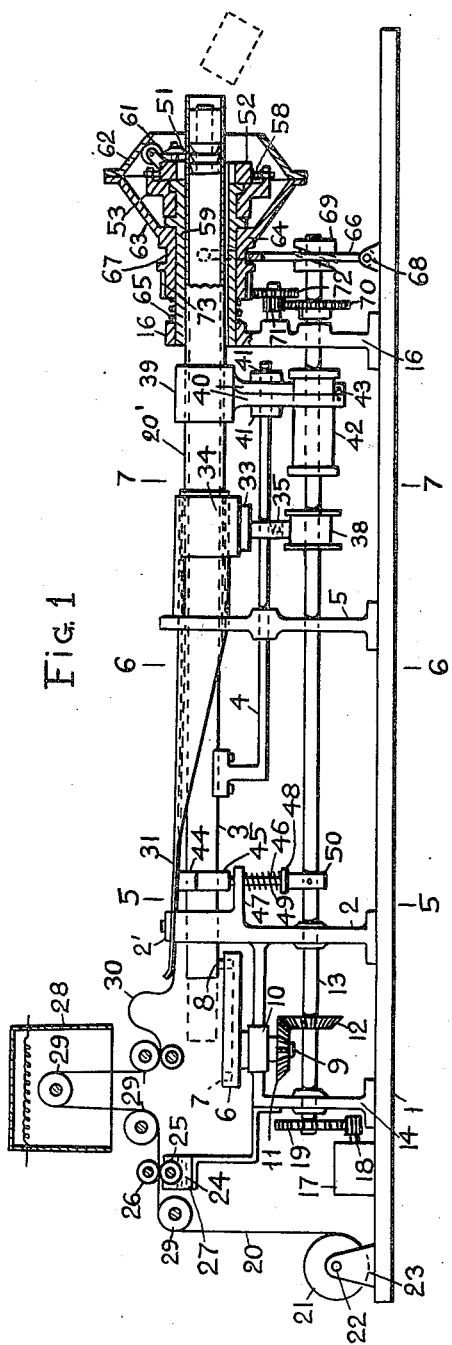
Fig. 1 is an elevational view of my machine partly in section.
Figure 2:
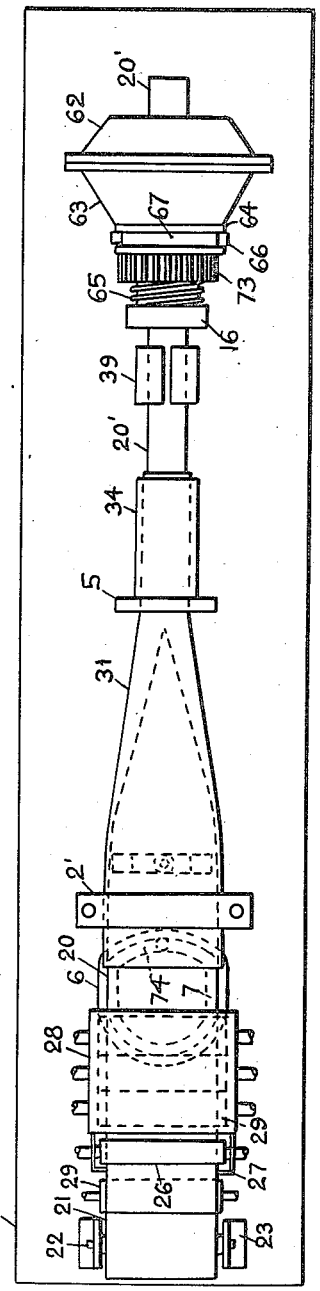
Fig. 2 is a top plan view of the same.
Figure 3:
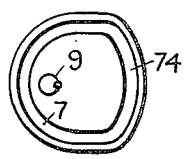
Fig. 3 is a detail view of a mandrel operating cam.

My tube-making machine in one of its forms as shown in Figs. 1 to 9 inclusive consists of a base 1 supporting a bracket 2 on which is slidably mounted the rear end of the mandrel 3. A guiding rod 4 is attached to the rear portion of the mandrel and extends forward, being slidably supported in a bracket 5 mounted on the base, thereby also supporting the mandrel. The mandrel is reciprocated by a cam or eccentric 6 having a groove 7 engaging a pin 8 at the rear end of the mandrel. The eccentric 6 is mounted on a vertical shaft 9 journaled in a bracket 10 and having a bevel gear 11 in mesh with a similar gear 12 on a cam shaft 13. The latter is journaled in brackets 14, 2, 5 and 16 and is rotated by a motor 17 or other suitable source of power through gears 18 and 19.

A strip 20 of sheet material such as paper, sheet metal, etc., is delivered to the rear portion of the mandrel from a roll 21 on a shaft 22 supported in brackets 23. Glue 24 or similar adhesive material, preferably of a thermoplastic nature, is applied to one edge of the strip by rollers 25 and 26, the roller 25 rotating in a container 27 with the adhesive material. A suitable glue is prepared with rubber or gum in a solvent, which is then dried in a drier 28 through which the strip is moved on rollers 29. The strip is continuously moved to the mandrel by power operated rollers. A loop 30 is formed on the strip to take care of the reciprocating motion of the mandrel while the strip is continuously fed by the rollers.

The strip 20 is bent into a tube by a former or forming tube 31 made of sheet material such as sheet steel. It is flat at its rear or entrance portion and is gradually turned around the mandrel 3, being supported on brackets 2 and 5 with an annular clearance around the mandrel. The strip 20, when pulled through the former 31, is bent into a tube having a slight clearance around the mandrel so that the latter can slide in the tube.

The overlapping edges of the tube 20' formed of the strip 20 are sealed together by the pressure of a block 33 which is heated by a heating element 34 at the sides of the block. The block is mounted on a rod 35 sliding over the cam shaft 13. A spring 37 tends to keep the block away from the tube, an eccentric or cam 38 on the cam shaft 13 pressing the block 33 against the tube for sealing its edges. The pressure may be applied during movement of the tube, the block producing an ironing action on the seam.

The tube 20' is pulled through the former 31 by a clamp 39. The latter has semi-circular halves enclosing the tube and supported on arms 40 pivoted together on the end of the rod 4 between two bushings 41. The lower ends of the arms 40 extend at the sides of a cam or eccentric 42 mounted on the cam shaft 13 and are joined together by a strong spring 43. The cam 42 is of an elliptical shape, so that when it is turned flatwise between the arms, the spring 43 draws the clamp tightly around the tube 20', releasing them when the cam is turned at right angles so that its long sides are positioned between the arms 40, spreading them apart. The cam 42 is sufficiently long so that the arms 40 can slide over it when the rod 4 is moved forward. On the return movement of the rod the cam 42 is turned flatwise, releasing the tube 20' so that the latter can remain stationary while the mandrel is moved back.

In order to prevent the tube 20' from sliding back with the mandrel during its return movement, brake blocks 44 are provided at the rear end of the former 31. The blocks are mounted on a yoke 45 having an extension rod 46 sliding in a bracket 47. The end of the rod 46 has an enlarged portion 48 and is pulled downward by a spring 49. A cam or eccentric 50, mounted on the cam shaft 13, engages the portion 48 so as to press the strip 20 by the blocks 44 against the flat portion of the former 31 during the return movement of the mandrel. An attachment is provided at the end of the mandrel for cutting off portions of the tube 20', if it is desired to have such short portions for making containers, enclosures for dry batteries, etc.

Figure 8:
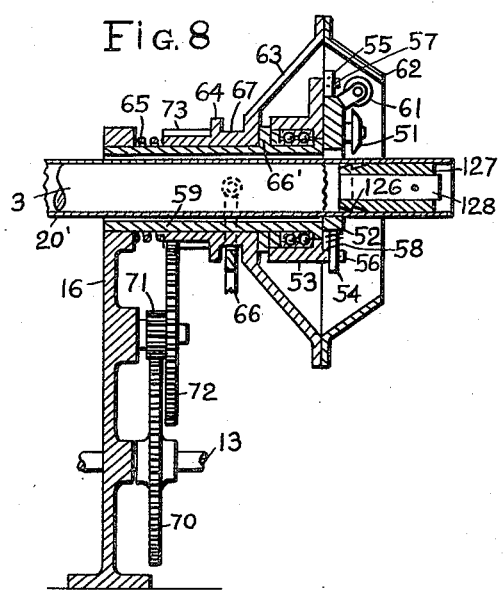
Fig. 8 is an enlarged detail view of a tube cutting mechanism.
Figure 9:
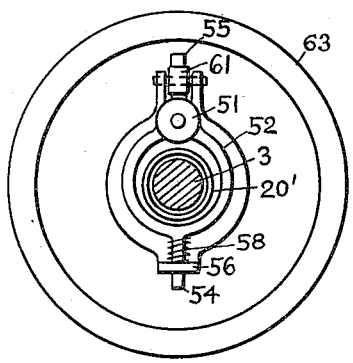
Fig. 9 is an end view of the same.

The cutting operation can be conveniently effected by a rotary cutter 51 on a frame 52 supported on the face of a plate 53. The frame 52 has extension rods 54 and 55 sliding in brackets 56 and 57 (Figs. 8 and 9). A spring 58 normally keeps the cutter end of the frame away from the tube 20'. The plate 53 is rotatively supported on a sleeve 59 external to the tube 20' and supported at the other end in a bracket 16 mounted on the base 1. For moving the cutter 51 against the tube 20' and for causing its rotation around the tube, a roller 61 is provided on the frame 52 which can be engaged by a bell-shaped ring 62. The latter is attached at its flange to a flanged portion 63 of a hub 64 rotatively and slidably mounted on the sleeve 59. A spring 65 normally keeps the hub 64 pressed against a shoulder 66' on the sleeve 59, in which position of the hub the bell 62 is out of contact with the roller 61. The bell 62 is moved rearward into engagement with the roller 61 by means of a fork 66 engaging a groove 67 in the hub 64 and rotatively supported at 68 (Fig. 1) on the base 1. The middle portion of the fork is engaged by a cam 69 on the cam shaft 13, so that once during each revolution of the cam shaft the cam moves the hub 64 by moving the fork.

The hub 64 is continuously rotated by a gear 70 on the cam shaft 13 engaging through gears 71 and 72 pinion teeth 73 on the hub. The teeth 73 are sufficiently long to retain the engagement with the gear 72 in all positions of the hub. The bell 62, when in engagement with the roller 61, depresses the frame 52, bringing the cutter in contact with the tube 20' and at the same time causing rotation of the frame with the cutter and plate 5 on the sleeve 59.

The tube 20' remains stationary during the cutting operation because the groove 7 in the eccentric 6 has a portion 74 concentric with the axis of its rotation, the pin 8 engaging the concentric portion at the end of the forward movement of the mandrel.

It is possible, of course, to make the cutter 51 movable in a horizontal direction by making, for instance, the sleeve 59 slidable in the bracket 60 and attached to the end of the rod 4.

The knife can be made to cut tubes of a multiple length of one stroke of the plunger by mounting the cam 69 on a separate shaft connected by suitable gears to the cam shaft 13.

A modified mandrel is shown in Fig. 11. The mandrel is made in the form of a collar 75 slidably mounted on a middle reduced portion 76 of a stationary rod 77. A spring 78 tends to keep the mandrel 75 at the rear end of the reduced portion 76. The clamp 39 holds the tube 20' against the mandrel 75 for pulling the tube forward, compressing the spring 78, the latter returning the mandrel back when the clamp is released.

My machine can be also used for making tubes of various shapes, such as square, hexagonal, oval, etc., by making the mandrels and formers of a corresponding shape. The device shown in Fig. 12, however, can be used only for round tubes.

It is evident that several strips 20 can be simultaneously fed into the former 13, one on top of the other, in order to produce a tube consisting of several layers. Thus a conduit can be made consisting of a metal tube with an insulation tube inside, or an insulation tube made of an insulating layer covered with a protective layer of paper or similar material.

For more effective cutting of the tube 20', an inner cutter 126 is provided, formed on a steel bushing 127 mounted on a reduced end portion 128 of the mandrel 3.

Figure 4:
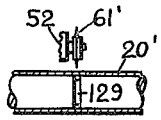
Fig. 4 is a detail view of a modified cutter.
Figure 5:
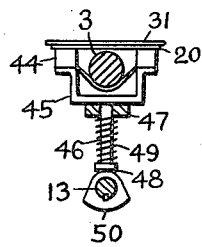
Fig. 5 is a detail view of a brake for a strip of material.
Figure 6:
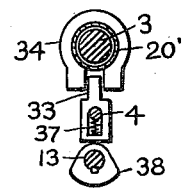
Fig. 6 is a detail view of a seam sealing plunger.
Figure 7:
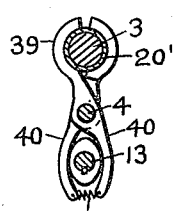
Fig. 7 is a detail view of a tube clamp.

A modified cutter 61' is shown in Fig. 4, representing a thin steel disc. The mandrel 3 has a corresponding groove 129.

It is understood that my tube-making machine may be further modified without departing from the spirit of the invention, as set forth in the appended claims.

I claim as my invention:

1. A machine for making tubes comprising a base, a mandrel slidably supported on the base, a cam-shaped member rotatively supported on the base operatively connected with the mandrel, means to rotate the cam-member, thereby reciprocating the mandrel, means to deliver a material to the mandrel, means to form a tube on the mandrel, means to move the tube forward when the mandrel is moved forward, means to retain the tube stationary during the return movement of the mandrel, and means to cut off the end portion of the tube at the end of the forward movement, the cam-member being so shaped as to cause the mandrel to remain stationary during the cutting-off operation.

2. A machine for making tubes comprising a base, a mandrel slidably supported on the base, means to deliver a material to the mandrel, means to form a tube from the material on the mandrel, a cam shaft rotatively supported on the base, means to rotate the cam shaft, a cam operatively connected with the cam shaft adapted to reciprocate the mandrel, a clamp encircling the tube, means to support the clamp on the mandrel, means on the cam shaft to cause the clamp to engage the tube for moving the tube forward during the forward movement of the mandrel and further adapted to release the clamp from the tube during the rearward movement of the mandrel, thereby permitting the tube to remain stationary, a rotary cutter for the tube at the front end of the mandrel, and means on the cam shaft to render the cutter operative at the end of the forward movement of the mandrel and to retain the mandrel and tube stationary during the cutting operation.

3. A machine for making tubes comprising a base, a mandrel slidably supported on the base, means to axially reciprocate the mandrel, means to deliver a material to the mandrel, means to form a tube on the mandrel from the material, a frame supported on the base around the tube for rotation on the axis of the tube, a cutter movably supported on the frame, yieldable means to urge the cutter away from the tube, an annular member supported on the base around the tube, means to rotate the annular member, and means to move the annular member against the frame, thereby engaging the frame and causing its rotation with the annular member and further causing the cutter to engage the paper for cutting off a piece of the tube during rotation of the frame.

4. A machine for making tubes comprising a base, a mandrel slidably supported at its rear end on the base, means to deliver a continuous strip of sheet material to the mandrel, means to apply an adhesive material to the edge of the strip, means to form a tube around the mandrel of the sheet material so as to cause overlapping of the edges of the material, means to reciprocate the mandrel, means to cause the tube to move forward with the mandrel and to remain stationary when the mandrel is moved rearward and means to press together the overlapping edges when the tube is stationary.

5. A machine for making tubes comprising a base, a mandrel slidably supported at its rear end on the base, a forming tube enclosing the mandrel at its middle portion and spaced therefrom, the forming tube representing a substantially flat plate gradually converging around the mandrel, means to deliver a strip of sheet material into the forming tube through its rear flat end, thereby forming a tube around the mandrel, means to reciprocate the mandrel, and means to cause the tube to move forward with the mandrel and to remain stationary when the mandrel is moved rearward.

6. A machine for making tubes comprising a base, a mandrel slidably supported at its rear end on the base, means to deliver a continuous strip of sheet material to the mandrel, means to form a tube around the mandrel of the sheet material, means to reciprocate the mandrel, means to cause the tube to move forward with the mandrel and to remain stationary when the mandrel is moved rearward, a plunger movably supported on the base, and means to press the plunger against the abutting edges of the tube for joining them together.

7. A method of making tubes of a sheet material consisting in delivering a strip of a sheet material to a reciprocating mandrel, forming a tube with a sliding clearance around the mandrel, causing the tube to move forward with the mandrel and to remain stationary when the mandrel is moved rearward, causing the tube and the mandrel to remain stationary at the end of the forward movement, and cutting off a length of the tube during the stationary period.

8. A machine for making tubes comprising a base, a mandrel slidably supported on the base, means to axially reciprocate the mandrel, means to deliver a strip of a sheet material to the mandrel, a former representing a rigid flat plate adapted to receive the sheet material, the plate being gradually bent around the mandrel forming a complete tubular guide, so as to cause the material to be formed into a tube inside the tubular guide, and means to move the tube forward together with the mandrel and to release the tube for remaining stationary when the mandrel is moved rearward.

9. A machine for making tubes comprising a base, a mandrel slidably supported on the base, means to axially reciprocate the mandrel, means to deliver a strip of sheet material to the mandrel, a former representing an elongated plate under the mandrel flat at the rear end and gradually converging around the mandrel at a distance therefrom, means to move the tube forward together with the mandrel, thereby forcing the sheet material through the former, means to release the tube for remaining stationary when the mandrel is moved rearward, and means to cut off the end portion of the tube at the end of the forward movement, the reciprocating means being adapted to retain the mandrel stationary at the end of the forward movement during the cutting-off operation.

FERDINAND HEINMETS.